United States Patent
Watanabe et al.

(10) Patent No.: US 12,258,892 B2
(45) Date of Patent: Mar. 25, 2025

(54) FASTENER AND SHIELD UNIT

(71) Applicant: ELRINGKLINGER MARUSAN CORPORATION, Tokyo (JP)

(72) Inventors: Takaya Watanabe, Saitama (JP); Yasuhumi Inoue, Saitama (JP); Shota Miura, Saitama (JP); Pascal Dirnberger, Bavaria (DE)

(73) Assignee: ELRINGKLINGER MARUSAN CORPORATION, Tokyo (JP)

( * ) Notice: Subject to any disclaimer, the term of this patent is extended or adjusted under 35 U.S.C. 154(b) by 0 days.

(21) Appl. No.: 17/914,861

(22) PCT Filed: Jan. 26, 2021

(86) PCT No.: PCT/JP2021/002630
§ 371 (c)(1),
(2) Date: Sep. 27, 2022

(87) PCT Pub. No.: WO2021/192580
PCT Pub. Date: Sep. 30, 2021

(65) Prior Publication Data
US 2023/0057516 A1    Feb. 23, 2023

(30) Foreign Application Priority Data

Mar. 27, 2020  (JP) ................. 2020-057772

(51) Int. Cl.
*F01N 13/10* (2010.01)
*B60K 13/04* (2006.01)
(Continued)

(52) U.S. Cl.
CPC ............ *F01N 13/102* (2013.01); *B60K 13/04* (2013.01); *F01N 13/14* (2013.01); *F16B 5/02* (2013.01);
(Continued)

(58) Field of Classification Search
CPC ....... B60K 13/04; F01N 13/08; F01N 13/102; F01N 13/14; F01N 13/1805;
(Continued)

(56) References Cited

U.S. PATENT DOCUMENTS

| 7,155,903 | B2 | 1/2007 | Ishiwa |
| 9,133,869 | B2 | 9/2015 | Friedow et al. |

(Continued)

FOREIGN PATENT DOCUMENTS

| JP | S5085751 A | 7/1975 |
| JP | 2005030571 A | 2/2005 |

(Continued)

OTHER PUBLICATIONS

International Search Report for International Application No. PCT/JP2021/002630; Date of Mailing, Apr. 6, 2021.

(Continued)

*Primary Examiner* — Phutthiwat Wongwian
*Assistant Examiner* — Diem T Tran
(74) *Attorney, Agent, or Firm* — CANTOR COLBURN LLP

(57) ABSTRACT

A support component that supports a shielding member, and a fixing component that fixes the shielding member to the structure via the support component. The support component has a cylindrical part, two flange parts and spring part. The spring parts have a first spring and a second spring with different load-deflection characteristics. The first spring and the second spring are interposed between each of the two flange parts and both sides of the shielding member. As a result, the invention provides a sufficient buffering effect.

5 Claims, 5 Drawing Sheets

(51) Int. Cl.
   *F01N 13/14*   (2010.01)
   *F16B 5/02*    (2006.01)
   *F16B 39/24*   (2006.01)
   *F16B 43/00*   (2006.01)

(52) U.S. Cl.
   CPC .............. *F16B 39/24* (2013.01); *F16B 43/00* (2013.01); *F01N 2450/24* (2013.01)

(58) Field of Classification Search
   CPC ...... F01N 2450/24; F16B 39/24; F16B 39/26; F16B 43/00; F16B 5/02; F16B 5/0258; F16B 5/0266
   See application file for complete search history.

(56) References Cited

U.S. PATENT DOCUMENTS

| | | |
|---|---|---|
| 9,856,904 B2 | 1/2018 | Friedow et al. |
| 2005/0028519 A1 | 2/2005 | Ishiwa |
| 2013/0034377 A1 | 2/2013 | Friedow et al. |
| 2015/0345538 A1 | 12/2015 | Friedow et al. |
| 2016/0102929 A1 | 4/2016 | Tachibana et al. |
| 2018/0313378 A1 | 11/2018 | Glauber et al. |
| 2020/0298387 A1* | 9/2020 | Akiba ..................... B25C 1/008 |

FOREIGN PATENT DOCUMENTS

| | | | |
|---|---|---|---|
| JP | 2007255693 | * | 10/2007 |
| JP | 2010156372 A | | 7/2010 |
| JP | 5885258 B2 | | 3/2016 |
| JP | 6038145 B2 | | 12/2016 |
| KR | 20110100163 | * | 9/2011 |
| WO | 2006128676 A1 | | 12/2006 |
| WO | 2017067727 A1 | | 4/2017 |
| WO | WO-2019078008 A1 | * | 4/2019 ............. B25C 1/008 |

OTHER PUBLICATIONS

EPO Extended European Search Report for corresponding EP Application No. 21775167.6; Issued Mar. 26, 2024; 57 pages.

* cited by examiner

FASTENER AND SHIELD UNIT

CROSS REFERENCE TO RELATED APPLICATIONS

This is the U.S. national stage of application No. PCT/JP2021/002630, filed on Jan. 26, 2021. Priority under 35 U.S.C. § 119 (a) and 35 U.S.C. § 365 (b) is claimed from Japanese Application No. 2020-057772, filed Mar. 27, 2020, the disclosure of which is also incorporated herein by reference.

TECHNICAL FIELD

The present invention relates to a fastener to fasten a shield member to a structure. Also, the present invention relates to a shield unit that includes the shield member and the fastener.

BACKGROUND ART

As a fastener to fasten a shield member to a structure, for example, there is a patent document 1 as described below. The fastener in the patent document 1 includes a support component to fasten a shield member such as a heat insulator or the like to a structure such as an exhaust manifold or the like, and bolts.

The support component has a cylindrical body penetrating through a hole made in the heat insulator, a washer fitted to one end of the tube body, a flange formed in the other one end of the cylindrical body, and elastic bodies which are secured between the washer and the heat insulator and between the flange and the heat insulator, respectively.

The bolt is screwed into fastening target sections of the exhaust manifold, through the cylindrical body of the support. Accordingly, the heat insulator is fastened to the exhaust manifold.

PRIOR ART DOCUMENT

Patent Document

[Patent Document 1] Patent No. 5885258 Gazette

OUTLINE OF INVENTION

Problem to be Solved by Invention

In the foregoing fastener, it is important to obtain a sufficient buffering effect by suppressing the transmission of vibrations of structures such as the exhaust manifold to the shield member such as the heat insulator.

The problem to be solved by the present invention is to provide a fastener from which the sufficient buffering effect can be obtained and a shield unit.

Means to Solve Problem

A fastener in the present invention is a fastener for fastening a shield member to a structure, and comprises: a support part for supporting the shield member, and a fixing component for fixing the shield member through the support component to the structure, wherein the support part has: a cylindrical part which is inserted into a hole provided in the shield member and into which the fixing component is inserted; two flange parts which are each provided at both ends of the cylindrical part and opposite to each other on both sides of the shield member; and spring parts which are interposed between each of the two flange parts and both sides of the shield member, and wherein the spring parts have a first spring and a second spring with different load-deflection characteristic, the first spring is interposed between each of the two flange parts and the both sides of the shield member, and the second spring is interposed between at least one of the two flange parts and at least one of the both sides of the shield member.

In the fastener according to this invention, it is preferable that the cylindrical part and the two flange parts are configured by: a sleeve in which a flange part is integrally provided at one end, and a ring fitted to the other end of the sleeve, the first spring is composed of: a sleeve-shaped spring in which a flange is integrally provided at one end and a ring-shaped spring fitted to the other end of the sleeve-shaped spring, the sleeve-shaped spring is inserted into the hole of the shield member and fitted to the sleeve from outside, the flange of the sleeve-shaped spring is interposed between one of the two flange parts and one of the both sides of the shield member, and the ring-shaped spring is interposed between the other of the two flange parts and the other of the both sides of the shield member.

In the fastener according to this invention, it is preferable that the support component has interposing parts which are each interposed between the both sides of the shield member and the spring part.

In the fastener according to this invention, it is preferable that the first spring is a spring configured by wire mesh, and the second spring is a wave washer.

A shield unit according to this invention comprises: a shield member for shielding a structure from transmitting its influence to surroundings; and the fastener in the present invention, wherein the shielding member has a hole into which the cylindrical part of the fastener is inserted.

Effect of Invention

The fastener and the shielding unit according to the present invention provide a sufficient buffering effect.

DESCRIPTION OF EMBODIMENT

Hereafter, one example of the embodiment (implementation) of the fastener and shield unit according to the present invention will be described in detail with reference to the drawings. By the way, since the drawings are the schematic views, the main components are shown, and the illustrations of components other than the main components are omitted. Also, a part of hatching is omitted, or a part of a cross-section is omitted.

Explanation of Configuration of Embodiment

Hereafter, configurations of a fastener 3 and a shield unit 1 according to this embodiment will be explained.

(Explanation of Shield Unit 1)

Figure 1:
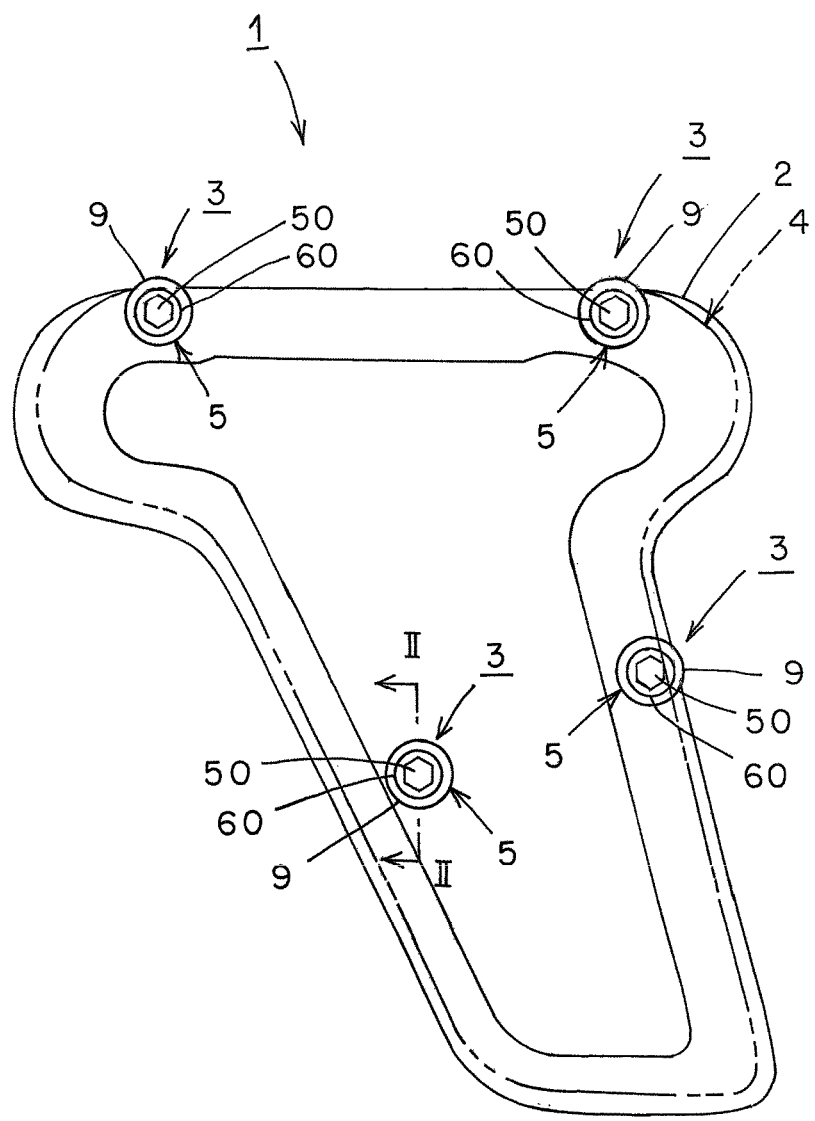
FIG. 1 is a usage situation view showing an embodiment of a fastener and a shield unit according to the present invention.
Figure 2:
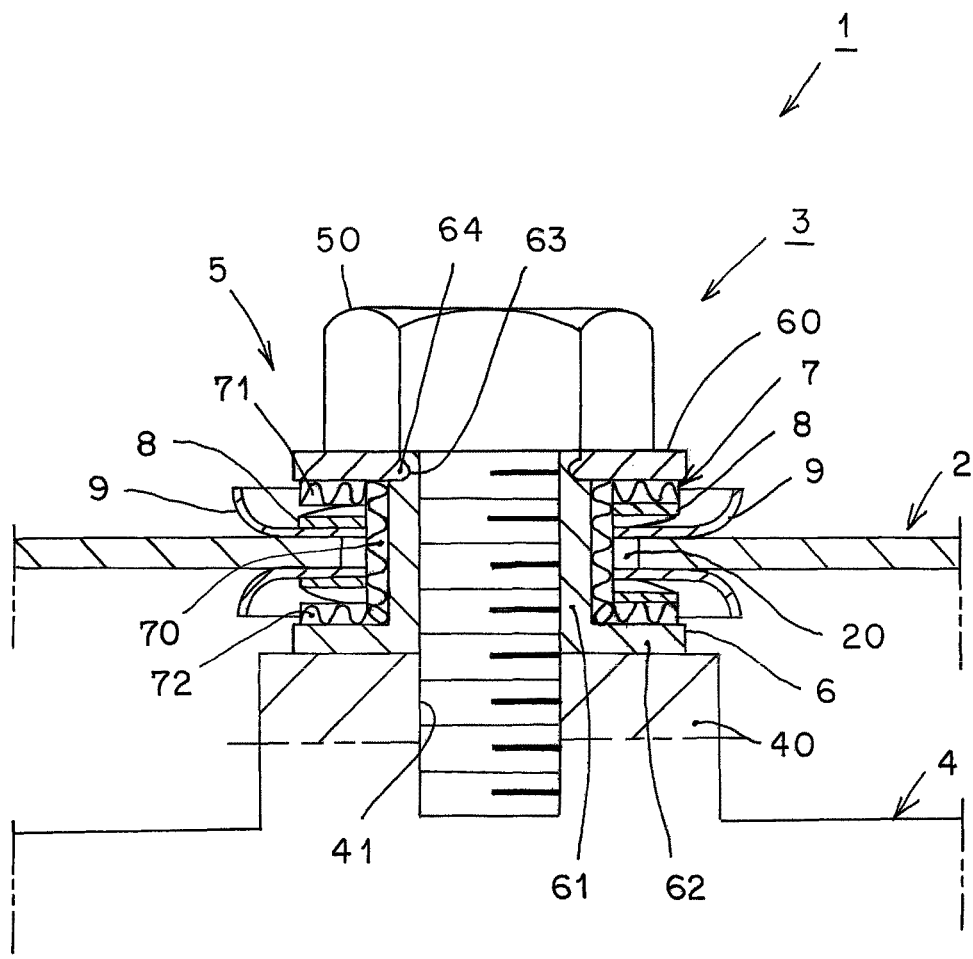
FIG. 2 is a longitudinal cross-sectional view (a II-II line cross-sectional view in FIG. 1) showing a main portion.
Figure 3:
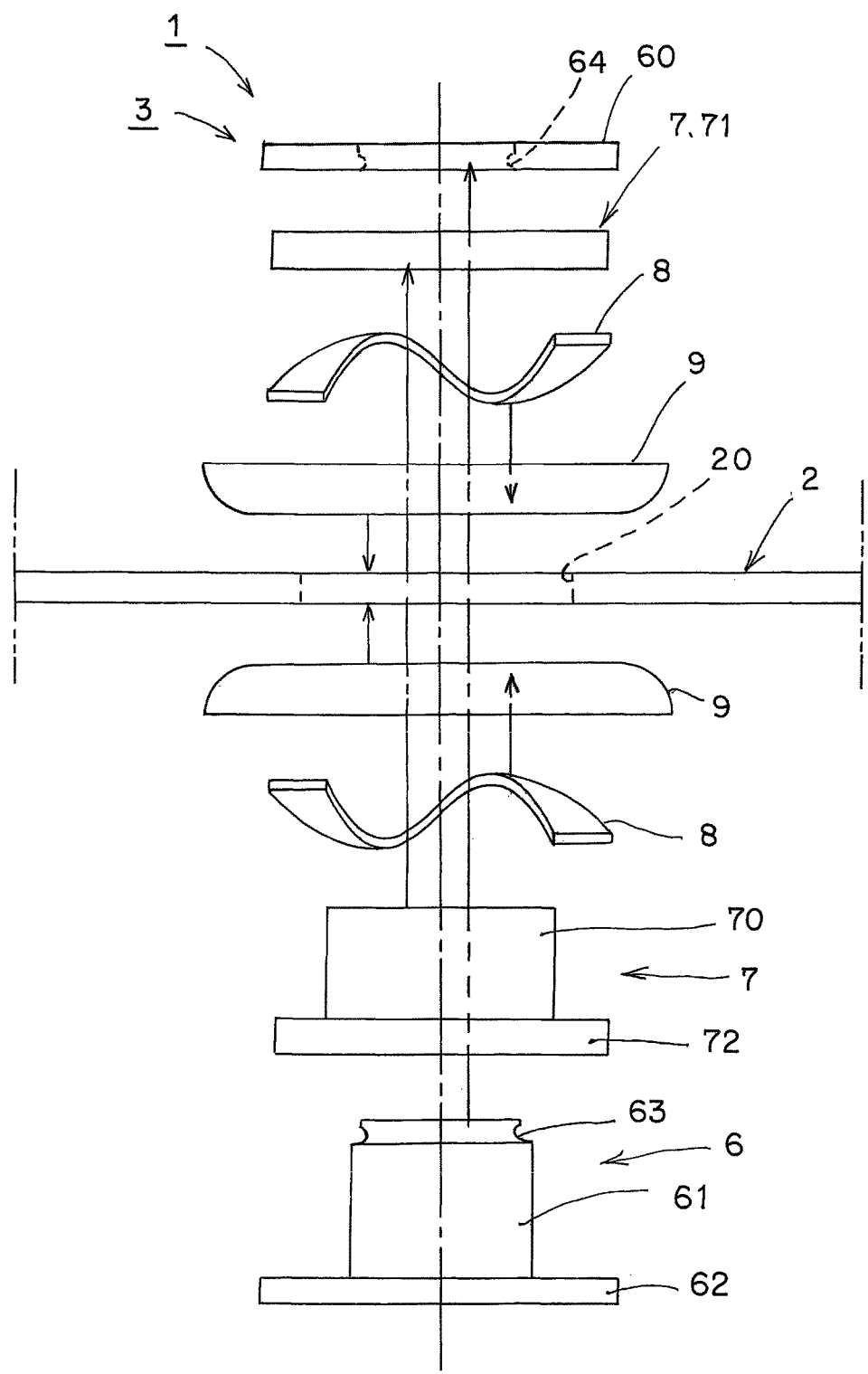
FIG. 3 is an exploded side view showing a main portion (a side view corresponding to FIG. 2).

As shown in FIG. 1 to FIG. 3, the shield unit 1 according to this embodiment includes a shield member (an insulator, a heat insulator or the like) 2, and the fastener 3 according to this embodiment.

(Explanation of Shield Member 2)

In this example, the shield member 2 is a metal member and configured by a metal cover member, a metal plate member and others. The shield member 2 shields an influence of a structure 4 from being transmitted to surroundings. That is, the shield member 2 protects the components, devices, members and others around the structure 4 from the influence of the structure 4.

The structure 4 is, for example, an exhaust manifold, an outlet pipe of a turbine and the like. As the influence of the structure 4, for example, there are heat, sound and others generated in the structure 4. In the structure 4, a fixing boss part 40 as a fixing part is integrally provided at a location to which the shield member 2 is fixed. A screw hole 41 is provided at the fixing boss part 40.

In the shield member 2, a hole 20 is provided at a location corresponding to the fixing boss part 40. In this example, the hole 20 is circular in shape. A cylindrical part 61 of a sleeve 6 in the fastener 3 is inserted into this hole 20.

The holes 20 of the shielding member 2 and the fixing boss part 40 of the structure 4 are provided four each in this example. By the way, the number and locations of the holes 20 and the fixing boss parts 40 are not limited to this example.

(Explanation of Fastener 3)

The fastener 3 includes a support component 5, and a bolt 50 as a fixing component. The support component 5 supports the shield member 2. The bolt 50 fix the shield member 2 to the structure 4 via the support component.

(Explanation of Support Component 5)

As shown in FIG. 2 and FIG. 3, the support component 5 has the sleeve 6 and a ring 60, a first spring 7 and a second spring 8 which serve as spring parts, and two washers (dish washers) 9 as interposing parts.

The sleeve 6 has the cylindrical part 61 and a flange part 62. An inner diameter of the cylindrical part 61 is approximately equal to an inner diameter of the screw hole 41 in the fixing boss part 40. The cylindrical part 61 is inserted into the hole 20 in the shield member 2. The bolt 50 is inserted into the cylindrical part 61.

The flange part 62 is integrally provided at one end (lower end) of the cylindrical part 61. An engagement groove 63 is provided in a circumferential direction on an outer circumference surface of the other end (upper end) of the cylindrical part 61. On the other hand, an engaging convex part 64 engaged in the engagement groove 63 is provided in the circumferential direction on an inner circumference surface of the ring 60 as a flange part.

The first spring 7 as the spring part is the spring configured by wire mesh, in this example. Also, the second spring 8 as the spring part is the spring configured by two wave washers, in this example.

Figure 5:
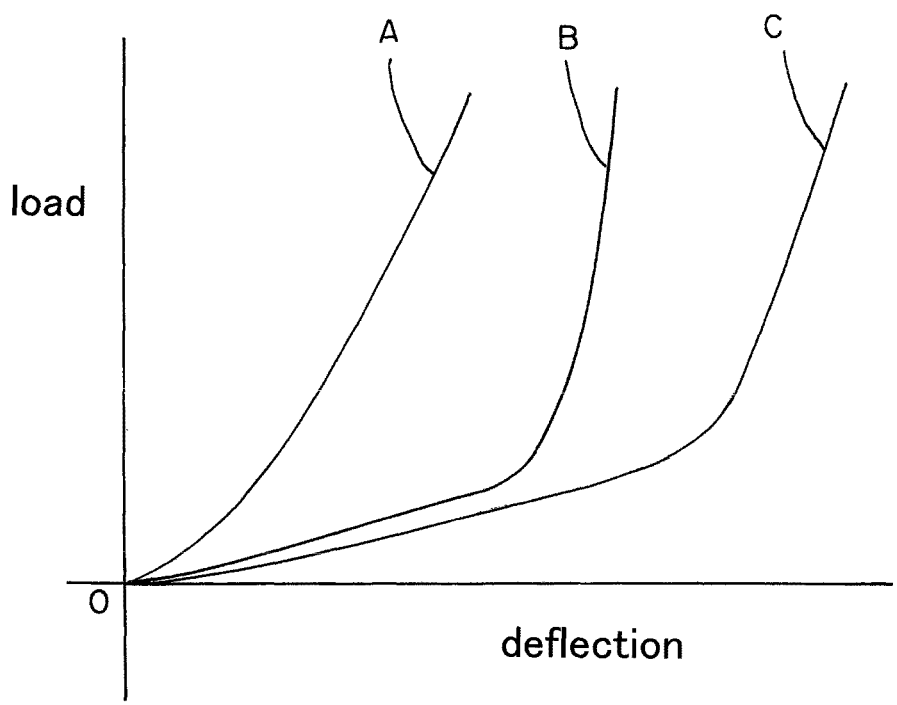
FIG. 5 is an explanatory view showing a load-deflection characteristic of a spring part.

As a result, as indicated in a load-deflection (displacement) characteristic of a spring in FIG. 5, a load-deflection characteristic of the first spring 7 (a curve A in FIG. 5) and a load-deflection characteristic of the second spring 8 (a curve B in FIG. 5) differ from each other.

The first spring 7 is composed of a sleeve-shaped spring 70 and a ring-shaped spring 71. The sleeve-shaped spring 70 is cylindrical in shape, and a flange 72 is integrally provided at one end (lower end). An inner diameter of the sleeve-shaped spring 70 that is cylindrical in shape is approximately equal to or slightly larger than an outer diameter of the cylindrical part 61 of the sleeve 6.

An inner diameter of the ring-shaped spring 71 is approximately equal to or slightly smaller than an outer diameter of the other end (upper end) of the sleeve-shaped spring 70. The ring-shaped spring 71 is fitted to the other end of the sleeve-shaped spring 70.

(Explanation of Fastening Step to Structure 4 by Fastener 3 in Shield Member 2)

At first, as shown in FIG. 2 and FIG. 3, in the shield member 2, the two washers 9 are each applied to both sides (upper and lower sides) of the location at which the hole 20 is provided and arranged there.

Next, the second springs 8 of two wave washers is placed in contact with two washers 9, the upper and lower, respectively.

In succession, the sleeve-shaped spring 70 of the first spring 7 is inserted from below into through holes of the two second springs 8, through holes of the two washers 9 and the hole 20 of the shield member 2. The flange 72 of this sleeve-shaped spring 70 is placed in contact with the second spring 8 of the lower wave washer. Also, the ring-shaped spring 71 of the first spring 7 is fitted from outside to the other end (upper end) of this sleeve-shaped spring 70. This ring-shaped spring 71 is placed in contact with the second spring 8 of the upper wave washer.

Then, the cylindrical part 61 of the sleeve 6 is inserted from below into the sleeve-shaped spring 70. The flange part 62 of this sleeve 6 is placed against the flange 72 of the sleeve-shaped spring 70 from below. Also, the engaging convex part 64 of the ring 60 is fitted from outside to the engagement groove 63 of this sleeve 6. Accordingly, the support component 5 of the fastener 3 is assembled to the shield member 2.

At this time, the cylindrical part, namely, the cylindrical part 61 of the sleeve 6 is inserted into the hole 20 of the shield member 2. The two flange parts, namely, the flange part 62 of the sleeve 6 and the ring 60 as the flange part are opposite to each other on both sides (upper and lower sides) of the shield member 2.

Also, the spring parts, namely, the first springs 7 and the second springs 8 are each interposed between the two flange parts, namely, the flange part 62 of the sleeve 6 and the ring 60 as the flange part, and the both sides (upper and lower sides) of the shield member 2, through the upper and lower two washers 9.

Moreover, the sleeve-shaped spring 70 of the first spring 7 is fitted from outside to the sleeve 6, namely, the cylindrical part 61 of the sleeve 6.

Furthermore, the flange 72 of the sleeve-shaped spring 70 in the first spring 7 is interposed between one of the two flange parts, namely, the flange part 62 of the sleeve 6 and one of the both sides of the shield member 2, namely, the lower side, through the lower washer 9.

Furthermore, the ring-shaped spring 71 of the first spring 7 is interposed between the other one of the two flange parts, namely, the ring 60 as the flange part, and the other side of the both sides of the shield member 2, namely, the upper side, through the upper washer 9.

Furthermore, the upper and lower two washers 9 as the interposing parts are interposed between the both sides (upper and lower sides) of the shield member 2, and the second spring 8 of the upper and lower two wave washers.

And, as shown in FIG. 1 and FIG. 2, the structure 4 is covered by the shield member 2. Also, the support component 5 in the fastener 3 assembled to the shield member 2 is positioned at the fixing boss part 40 of the structure 4.

Moreover, a hollow part of the cylindrical part 61 in the support component 5 is positionally matched with the screw hole 41 of the fixing boss part 40. And, the screw part of the bolt 50 in the fastener 3 is inserted into the cylindrical part 61 and screwed into the screw hole 41 of the fixing boss part 40.

As a result, the support component 5 is sandwiched and secured between a head part of the bolt 50 and the fixing boss part 40. Consequently, the shield member 2 is fastened to the structure 4, through the support component 5 and bolt 50 in the fastener 3.

Explanation of Action of Embodiment

The fastener 3 and shield unit 1 according to this embodiment are structured by the foregoing configuration. Their actions will be explained below.

The shield member 2 is fastened to the structure 4 by the fastener 3 in a situation in which the structure 4 is covered. Accordingly, the shield member 2 shields the heat, sound and others generated in the structure 4. As a result, the shield member 2 protects the components, devices, members and others around the structure 4 from being inflected by the heat, sound and others generated in the structure 4.

The fastener 3 supports the shield member 2 by means of the support component 5 and fastens the shielding member 2 to the fixing boss part 40 of the structure 4 by means of the bolt 50 as the fixing component. As a result, in the fastener 3, vibration generated in the structure 4 is absorbed and buffered by the support component 5, and the vibration generated in the structure 4 is prevented from being transmitted to the shield member 2.

Explanation of Effect of Embodiment

The fastener 3 and shield unit 1 according to this embodiment have the above configuration and actions. Their effect will be explained below.

With regard to the fastener 3 and shield unit 1 according to this embodiment, the first spring 7 and the second spring 8 in which their load—deflection characteristics differ from each other are interposed between the shield member 2 and the structure 4. Thus, the vibrations of the structure 4 are suppressed from being transmitted to the shield member 2, providing sufficient buffering effect.

Due to the foregoing, the fastener 3 and shield unit 1 according to this embodiment suppressed a transmission of vibration of the structure 4 to the shield member 2 by the sufficient buffering effect. As a result, it is possible to surely prevent damage such as crack and the like from occurring in the shield member 2 due to vibration of the structure 4.

Moreover, in the fastener 3 and shield unit 1 according to this embodiment, gap is not provided between the shield member 2 and the first spring 7 and second spring 8, for the purpose of cutting off the transmission (input) of the vibration of the structure 4 to the shield member 2. Thus, sound swing (noise) is never deteriorated.

Figure 4:
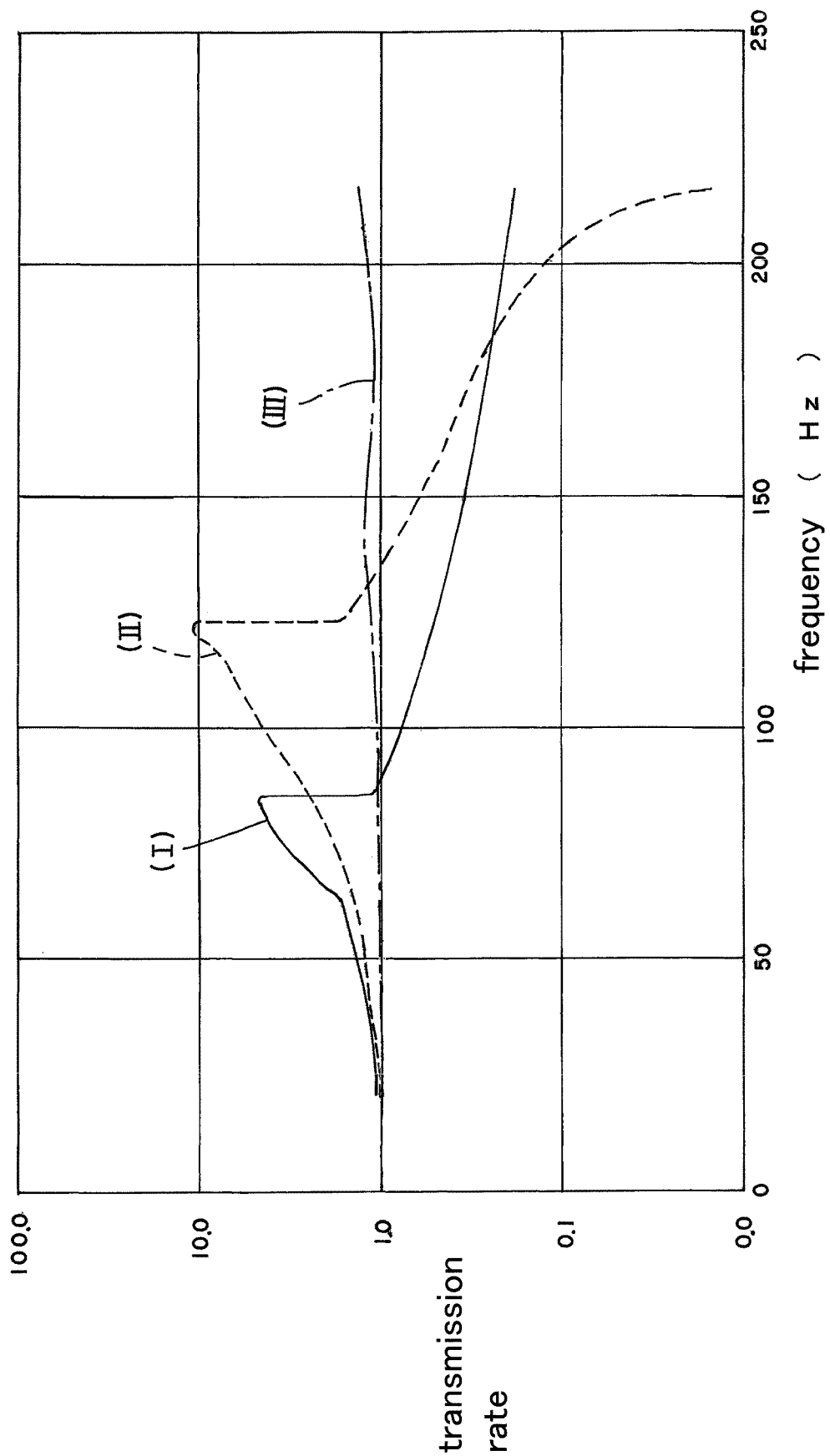
FIG. 4 is an explanatory view showing an attenuation characteristic.

Hereafter, with reference to FIG. 4, an attenuation characteristic (I) of the fastener 3 and shield unit 1 according to this embodiment is compared with an attenuation characteristic (II) of a fastener in the above patent document 1 that is a fastener according to a comparison example and an attenuation characteristic (III) of a fastener described in U.S. Pat. No. 6,038,145 Gazette that is a comparison example.

The fastener in the above patent document 1 is the fastener in which springs (elastic bodies, for example, wire meshes) are interposed between a washer, a flange part and a heat insulator, respectively. The fastener described in the U.S. Pat. No. 6,038,145 Gazette is the fastener in which a plate spring is directly applied to the shield member.

FIG. 4 is the explanation view showing the attenuation characteristics. A longitudinal axis indicates a transmission rate of the vibration. A lateral axis indicates a frequency (Hz) of the vibration. A region in which the transmission rate is 1.0 or less is an attenuation region, and an attenuation effect of the vibration is obtained. Also, as indicated in the attenuation characteristics (I) and (II), point of the maximum value of the transmission rate indicates a resonance point. when the frequency (Hz) at this resonance point is low, the attenuation efficiency (namely, the buffering effect) is good. That is, at a time point when the frequency (Hz) of the vibration is low, the attenuation of the vibration is started, thereby resulting in the good attenuation efficiency (namely, good buffering effect).

With regard to the attenuation characteristic (III) of the fastener described in the Patent No. 6038145 Gazette, as indicated by a one-point chain line curve, even at a time point when the frequency (Hz) is about 220 (Hz), the attenuation efficiency is not obtained in this example. Also, with regard to the attenuation characteristic (II) of the fastener in the above patent document 1, as indicated by a dashed line curve, at a time point when the frequency (Hz) is high (large), in this example, at a time point of about 125 (Hz), the attenuation efficiency is obtained because it comes in the attenuation region.

On the other hand, with regard to the attenuation property (I) of the fastener 3 and shield unit 1 according to this embodiment, as indicated by a solid line curve, at a time point when the frequency (Hz) is low (small), in this example, at a time point of about 85 (Hz), the attenuation efficiency is obtained because it comes in the attenuation region. Moreover, when the attenuation characteristic (I) of the fastener 3 and shield unit 1 according to this embodiment is compared with the attenuation characteristic (II) of the fastener in the above patent document 1, the frequency (Hz) at the resonance point is 40 (Hz) lower (smaller) in this example. Thus, the sufficient buffering effect can be obtained by its difference.

Here, the load-deflection characteristic of the spring part is explained with reference to FIG. 5. A curve A indicates a load-deflection characteristic of the first spring 7 configured by the wire mesh. Also, a curve B indicates a load-deflection characteristic of the second spring 8 configured by the wave washer.

The load-deflection characteristic of the spring part in the fastener 3 and shield unit 1 according to this embodiment is the synthesis (series connection) of the load-deflection characteristic (curve A) of the first spring 7 configured by the wire mesh and the load-deflection characteristic (curve B) of the second spring 8 that is the wave washer, as indicated by a curve C.

As a result, in the fastener 3 and shield unit 1 according to this embodiment, as mentioned above, the transmission to the shield member 2 of the vibration of the structure 4 can be suppressed, thereby obtaining the adequate shock absorption effect.

In the fastener 3 and shield unit 1 according to this embodiment, the first spring 7 in the spring part is composed of: the sleeve-shaped spring 70 in which the flange 72 is integrally provided at one end; and the ring-shaped spring 71 fitted to the other end of the sleeve-shaped spring 70, and the flange 72 of the sleeve-shaped spring 70 and the ring-shaped spring 71 are each interposed between the two flange parts (namely, the flange part 62 of the sleeve 6 and the ring 60)

and the both sides (upper and lower sides) of the shield member 2. As a result, in the fastener 3 and shield unit 1 according to this embodiment, the flange part 72 of the sleeve-shaped spring 70 in the first spring 7 and the ring-shaped spring 71, together with the second spring 8 composed of the upper and lower two wave washers which are each interposed between the two flange parts and the both sides of the shield member 2, suppress the vibration of the structure 4 from being transmitted to the shield member 2. Accordingly, in the fastener 3 and shield unit 1 according to this embodiment, it is possible to obtain the sufficient buffering effect.

Moreover, in the fastener 3 and shield unit 1 according to this embodiment, the cylindrical part of the sleeve-shaped spring 70 in the first spring 7 in the spring part is interposed between the fixing boss part 40 of the structure 4 and the head part of the bolt 50 as the fixing component, through the flange part 62 of the sleeve 6 and the ring 60. As a result, in the fastener 3 and shield unit 1 according to this embodiment, the cylindrical part of the sleeve-shaped spring 70 surely suppresses the vibration of the structure 4 from being transmitted to the shield member 2, due to the flange 72 of the sleeve-shaped spring 70, the ring-shaped spring 71 and the second springs 8. Thus, it is possible to obtain the more sufficient buffering effect.

Moreover, in the fastener 3 and shield unit 1 according to this embodiment, the cylindrical part of the sleeve-shaped spring 70 is interposed between the outer surface of the cylindrical part 61 in the sleeve 6 and the inner surface of the hole 20 of the shield member 2. Thus, even if the shield member 2 and the structure 4 are shifted laterally (in a direction parallel to the surface of the shield member 2), the cylindrical part of the sleeve-shaped spring 70 can prevents the outer surface of the cylindrical part 61 of the sleeve 6 and the inner surface of the hole 20 in the shield member 2 from hitting each other. Consequently, it is possible to improve the durability and avoid the generation of sound.

In the fastener 3 and shield unit 1 according to this embodiment, the upper and lower two washers 9 as the interposing parts are each interposed between the both sides (upper and lower sides) of the shield member 2 and the second spring 8 composed of the upper and lower two wave washers in the spring parts. As a result, in the fastener 3 and shield unit 1 according to this embodiment, a spring force of the second spring 8 and a spring force of the first spring 7 act in surface contact state on the shield member 2 through the washers 9. Consequently, in the fastener 3 and shield unit 1 according to this embodiment, it is possible to surely suppress the vibration of the structure 4 from being transmitted to the shield member 2. Thus, it is possible to obtain the more sufficient buffering effect.

Moreover, in the fastener 3 and shield unit 1 according to this embodiment, the upper and lower two washers 9 as the interposing parts can prevents the both sides (upper and lower sides) of the shield member 2 and the second spring 8 of the upper and lower two wave washers in the spring parts from hitting each other. Consequently, it is possible to improve the durability and avoid the generation of sound.

Moreover, in the fastener 3 and shield unit 1 according to this embodiment, outer circumferential edge portions of the upper and lower two washers (dish washers) 9 as the interposing parts are curved, so the curved surfaces of those washers 9 hit both sides (upper and lower sides) of the shield member 2. That is, the corners of the outer circumferential edge portions of these washers 9 do not bite into both sides (upper and lower sides) of the shield member 2. Thus, the durability can be improved.

In the fastener 3 and shield unit 1 according to this embodiment, the first spring 7 in the spring part is the spring configured by the wire mesh, and the second spring 8 in the spring part is the wave washer. As a result, in the fastener 3 and shield unit 1 according to this embodiment, the load-deflection characteristic of the first spring 7 differs from the load-deflection characteristic of the second spring 8, and the vibration of the structure 4 is surely suppressed from being transmitted to the shield member 2. Thus, it is possible to obtain the more sufficient buffering effect.

In the fastener 3 and shield unit 1 according to this embodiment, the first spring 7 in the spring part is the spring configured by the wire mesh. Thus, it is suitable for manufacturing the sleeve-shaped spring 70 in which the flange 72 is integrally provided at one end. Moreover, it is suitable for fitting the ring-shaped spring 71 to the other end of the sleeve-shaped spring 70. As a result, in the fastener 3 and shield unit 1 according to this embodiment, it is possible to easily manufacture the sleeve-shaped spring 70 in which the flange 72 is integrally provided at one end, and the ring-shaped spring 71. Moreover, it is possible to easily assemble.

Explanation of Example Other Than Embodiment

In this embodiment, an example is explained that the cylindrical part and the two flange parts are composed of two parts: a sleeve integrally composed of the cylindrical part 61 and the flange part, and the ring 60 as the flange part. However, in this invention, it can also be applied to the case in which the cylindrical part and the two flange parts are composed of three parts: the cylindrical part 61 and the flange part 62, which are divided from the sleeve 6 of which the cylindrical part 61 and the flange part 62 are integral structures, and the ring 60 as the flange part.

In this embodiment, an example will be described the second springs 8 consisting of the two wave washers are each interposed between the two flange parts, namely, the flange part 62 of the sleeve 6 and the ring 60 as the flange part, and both sides (upper and lower sides) of the shield member 2. However, in the present invention, the second spring 8 of one wave washer is interposed between one flange part, namely, the flange part 62 of the sleeve 6 or the ring 60 as the flange part, and one surface (upper surface or lower surface) of the shield member 2.

In this embodiment, an example will be described the first spring 7 of the spring part composed of the cylindrical sleeve-shaped spring 70 in which the flange part 72 is integrally provided at one end (lower end), and the ring-shaped spring 71. However, in the present invention, the first spring of the spring part may consist of two flange-shaped or ring-shaped springs or composed of two flange-shaped or ring-shaped springs and one cylindrical spring.

In this embodiment, an example will be described the washer 9 is used as the interposing part. However, in the present invention, a member other than the washer 9, such as a gasket or the other member may be used as the interposing part.

In this embodiment, the spring configured by the wire mesh (the sleeve-shaped spring 70 and the ring-shaped spring 71) is used as the first spring 7. However, in the present invention, a spring other than the spring configured by the wire mesh may be used as the first spring.

In this embodiment, the wave washer is used as the second spring 8. However, in the present invention, a spring other than the wave washer may be used as the second spring.

By the way, the fastener in the present invention is not limited by the above-mentioned embodiments.

REFERENCE SIGNS LIST 1 shield unit
2 shield member
20 hole
3 fastener
4 structure
40 fixing boss part
41 screw hole
5 support component
50 bolt (fixing component)
6 sleeve
60 ring
61 cylindrical part
62 flange part
63 engagement groove
64 engaging convex part
7 first spring (spring part)
70 sleeve-shaped spring
71 ring-shaped spring
72 flange
8 second spring (spring part)
9 washer (interposing part)
A curve indicating load-deflection characteristic of first spring
B curve indicating load-deflection characteristic of second spring
C curve indicating load-deflection characteristic of combination of first spring and second spring
(I) curve indicating attenuation characteristic of the fastener 3 according to this embodiment
(II) curve indicating attenuation characteristic of a fastener (the fastener in above patent document 1) according to comparison example in which spring is used
(III) curve indicating attenuation property of fastener (fastener described in U.S. Pat. No. 6,038,145 Gazette) according to comparison example in which spring is not used

The invention claimed is:

1. A fastener for fastening a shield member to a structure, comprising:
 a support component for supporting the shield member; and
 a fixing component for fixing the shield member through the support component to the structure,
 wherein the support component has:
 a tube part which is inserted into a hole provided in the shield member and into which the fixing component is inserted;
 two flange parts which are each provided at both ends of the tube part and opposite to each of both sides of the shield member; and
 spring parts which are interposed between each of the two flange parts and both sides of the shield member, and
 wherein the spring parts have a first spring and a second spring with different load-deflection characteristic,
 the first spring is interposed between each of the two flange parts and both sides of the shield member, and
 the second spring is interposed between at least one of the two flange parts and at least one of both sides of the shield member.

2. The fastener according to the claim 1,
 wherein the tube part and the two flange parts are configured by a sleeve in which a flange part is integrally provided at one end and a ring fitted to the other end of the sleeve,
 the first spring is composed of a sleeve-shaped spring in which a flange is integrally provided at one end and a ring-shaped spring fitted to the other end of the sleeve-shaped spring,
 the sleeve-shaped spring is inserted into the hole of the shield member and fitted to the sleeve from outside,
 the flange of the sleeve-shaped spring is interposed between one of the two flange parts and one of both sides of the shield member, and
 the ring-shaped spring is interposed between the other of the two flange parts and the other of both sides of said shield member.

3. The fastener according to the claim 1, wherein the support component has interposing parts which are each interposed between both sides of the shield member and the spring parts.

4. The fastener according to the claim 1,
 wherein the first spring is a spring configured by wire mesh, and
 the second spring is a wave washer.

5. A shield unit comprising:
 a shield member for shielding a structure from transmitting its influence on surroundings; and
 the fastener according to the claim 1,
 wherein the shielding member has a hole into which the tube part of the fastener is inserted.

\* \* \* \* \*